United States Patent [19]

Fredricsson et al.

[11] Patent Number: 5,119,373
[45] Date of Patent: Jun. 2, 1992

[54] MULTIPLE BUFFER TIME DIVISION MULTIPLEXING RING

[75] Inventors: Staffan A. Fredricsson, Newark; Simon S. Chouldjian, San Francisco, both of Calif.

[73] Assignee: Luxcom, Inc., Hayward, Calif.

[21] Appl. No.: 477,569

[22] Filed: Feb. 9, 1990

[51] Int. Cl.[5] .............................................. H04J 3/02
[52] U.S. Cl. .................... 370/85.15; 370/85.6; 340/825.5
[58] Field of Search ................... 370/85.5, 85.6, 85.15; 340/825.05, 825.5, 825.51

[56] References Cited

U.S. PATENT DOCUMENTS

| 4,707,693 | 11/1987 | Hessel | 370/94.1 |
| 4,709,364 | 11/1987 | Hasegawa et al. | 370/94.1 |
| 4,792,944 | 12/1988 | Takahashi et al. | 370/85.15 |

Primary Examiner—Douglas W. Olms
Assistant Examiner—Wellington Chin
Attorney, Agent, or Firm—McCubbrey, Bartels, Meyer & Ward

[57] ABSTRACT

A multiple-buffer time-division-multiplexing ring is provided for enabling different computers using various communication protocols with different delay constraints to use the ring simultaneously for communication with a plurality of peripheral devices while at the same time maximizing the number of connections to peripheral devices which may be supported by the multiplexer ring. The multiple-buffer time-division-multiplexing ring utilizes two or more parallel or serial buffers in the ring which may be located in a permanently or temporarily assigned master node. Digital data a re carried around the ring in a plurality of time-slots wherein one or more time-slots are allocated for each user of the ring. The time-division-multiplexing ring uses the multiple buffers to advance time-slots for delay-sensitive protocols ahead of time-slots for non-delay-sensitive protocols.

47 Claims, 6 Drawing Sheets

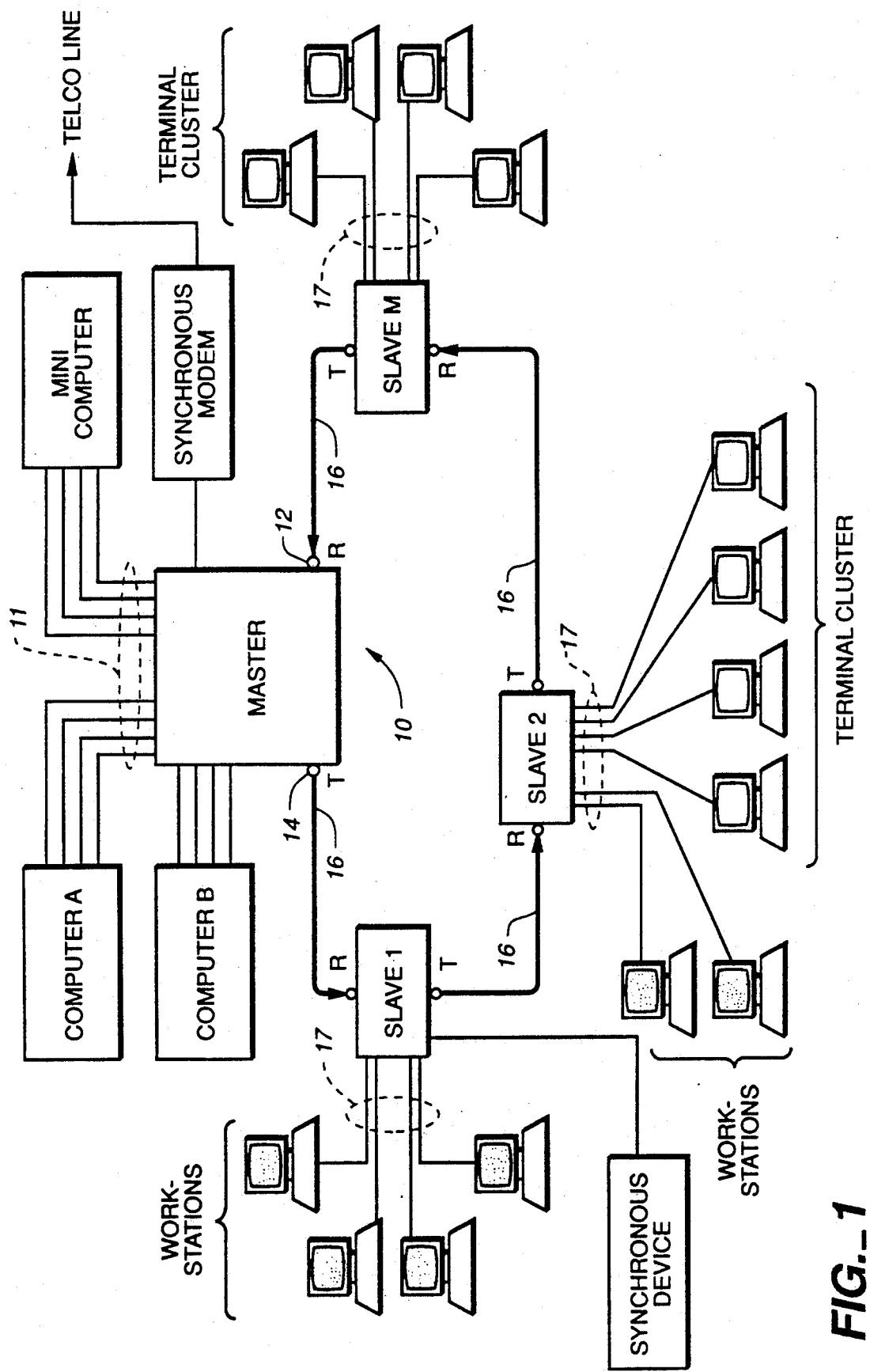
FIG._1

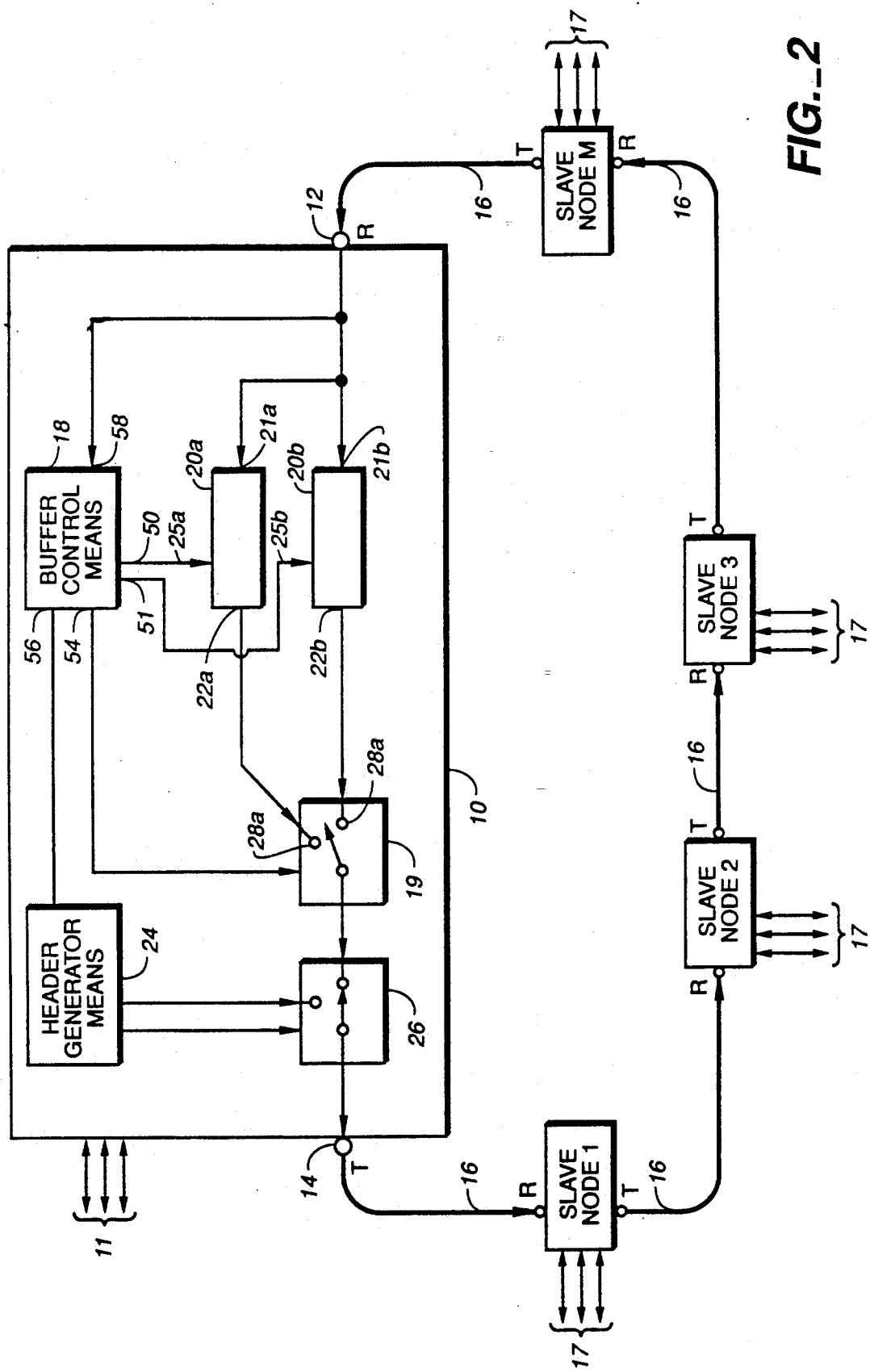
FIG._2

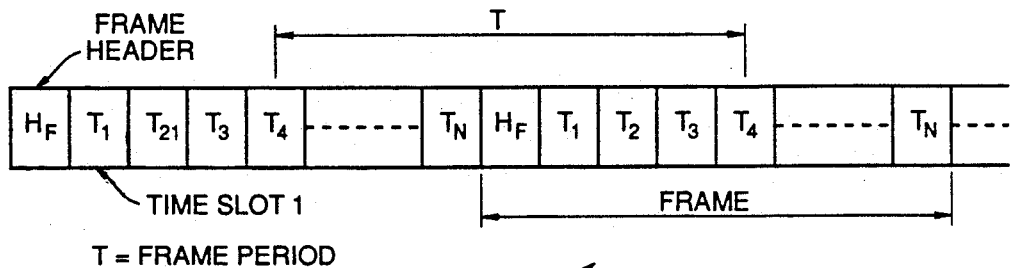
FIG._3
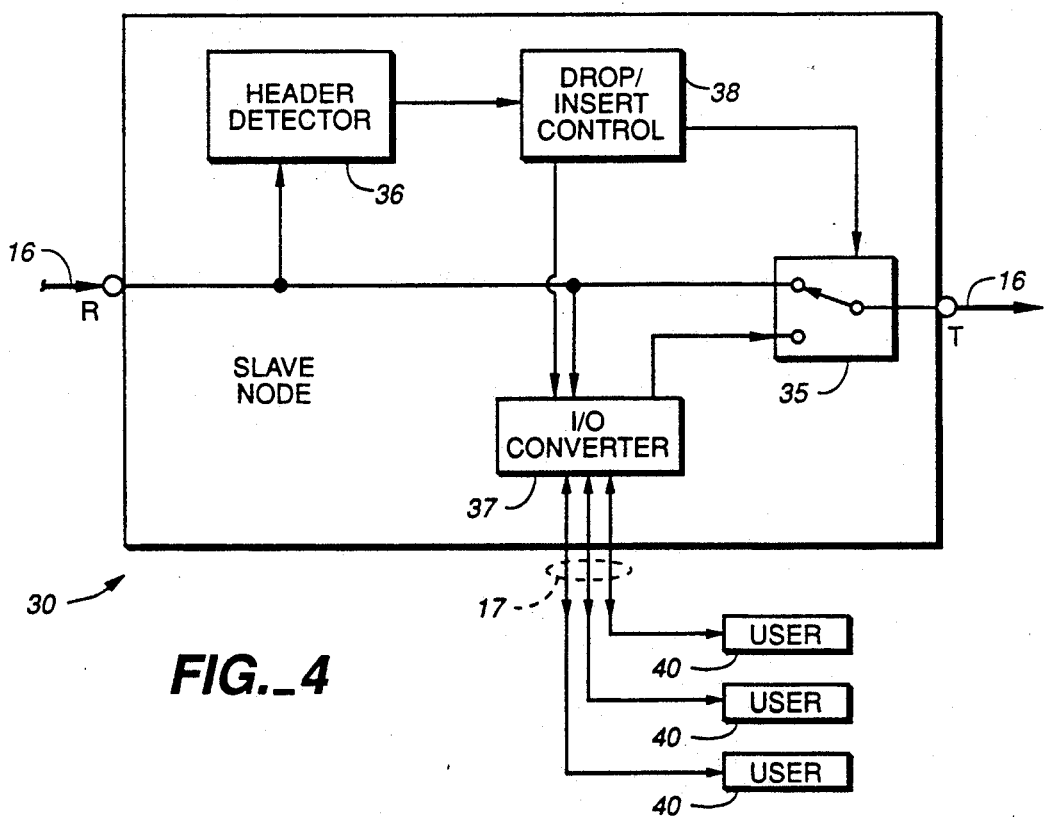
FIG._4

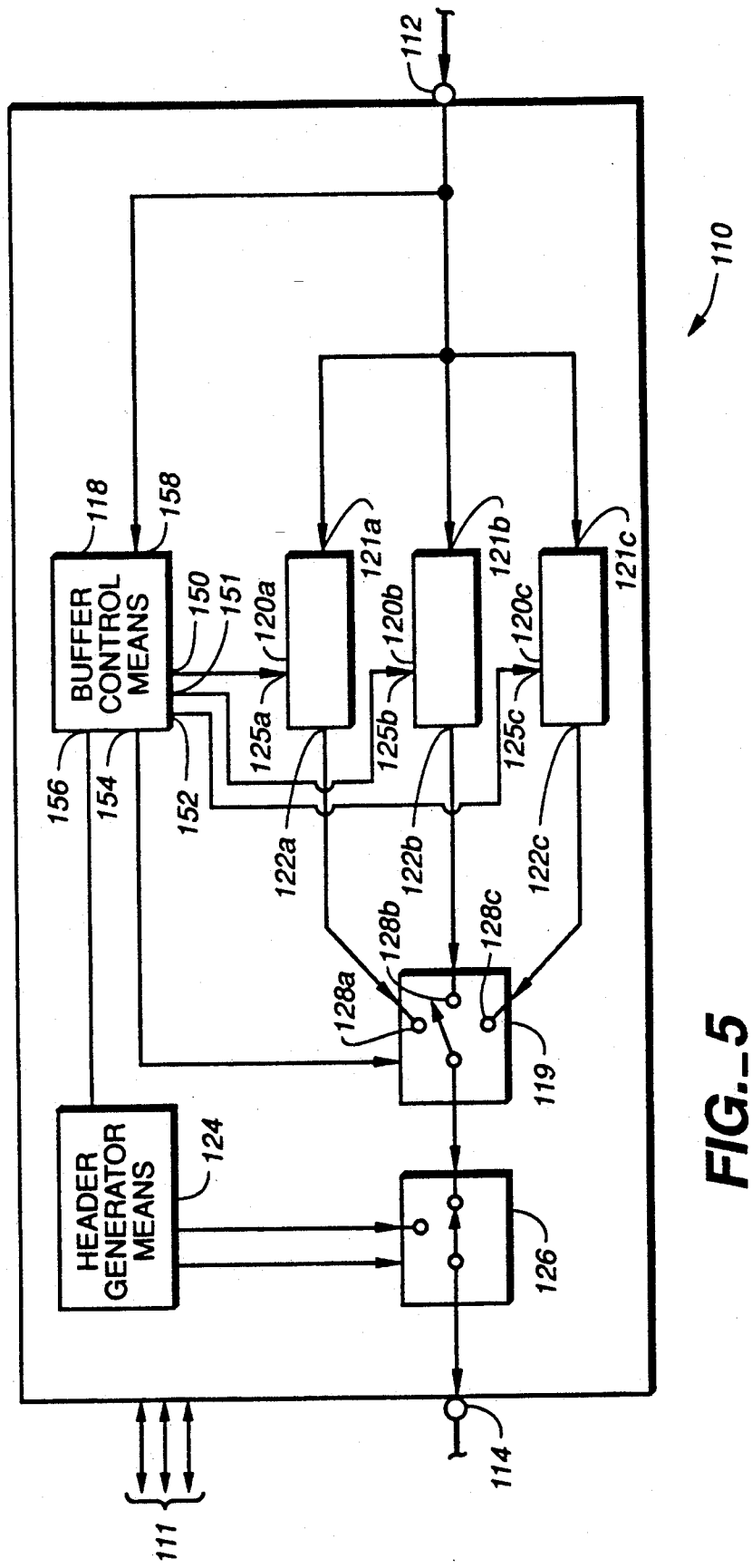
FIG._5

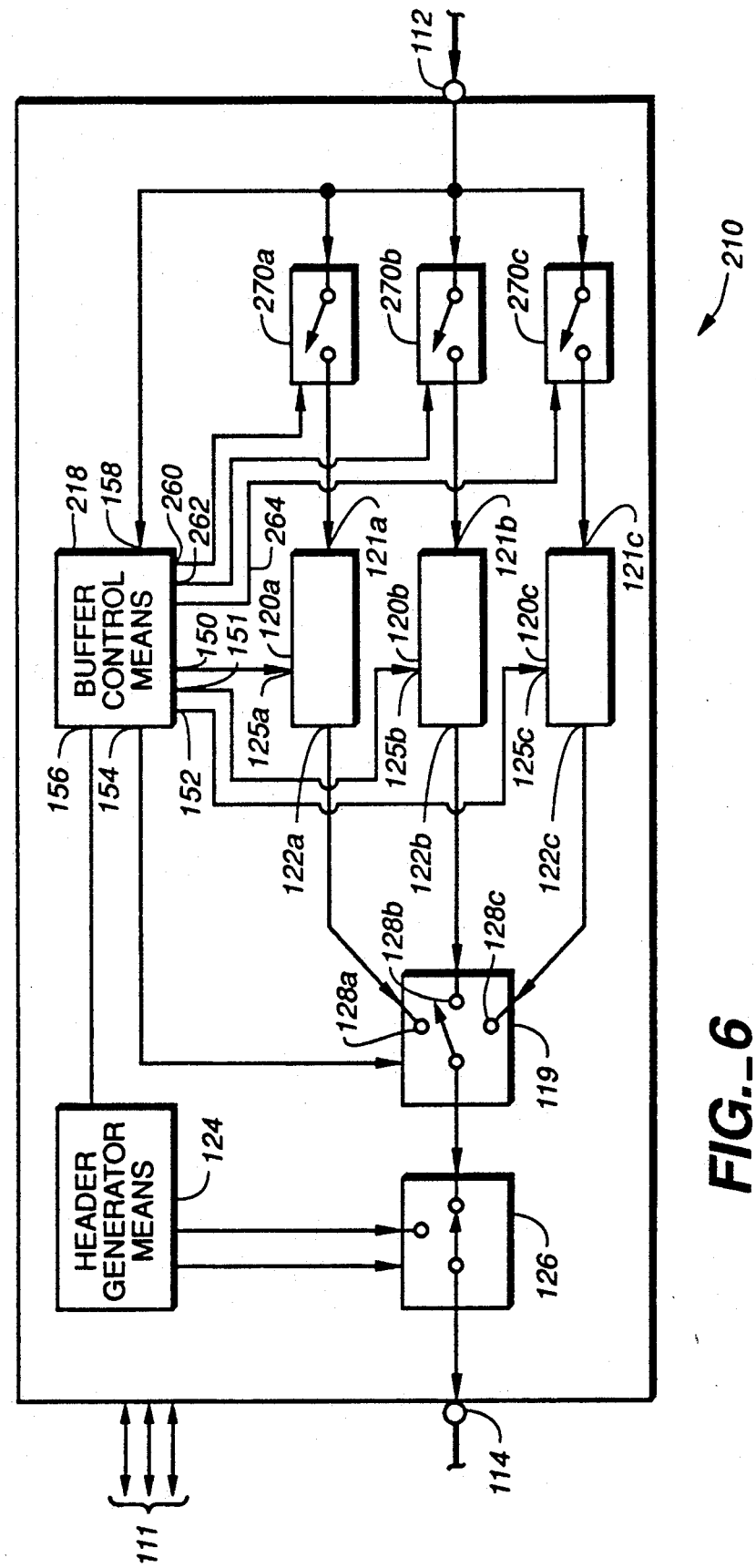
FIG._6

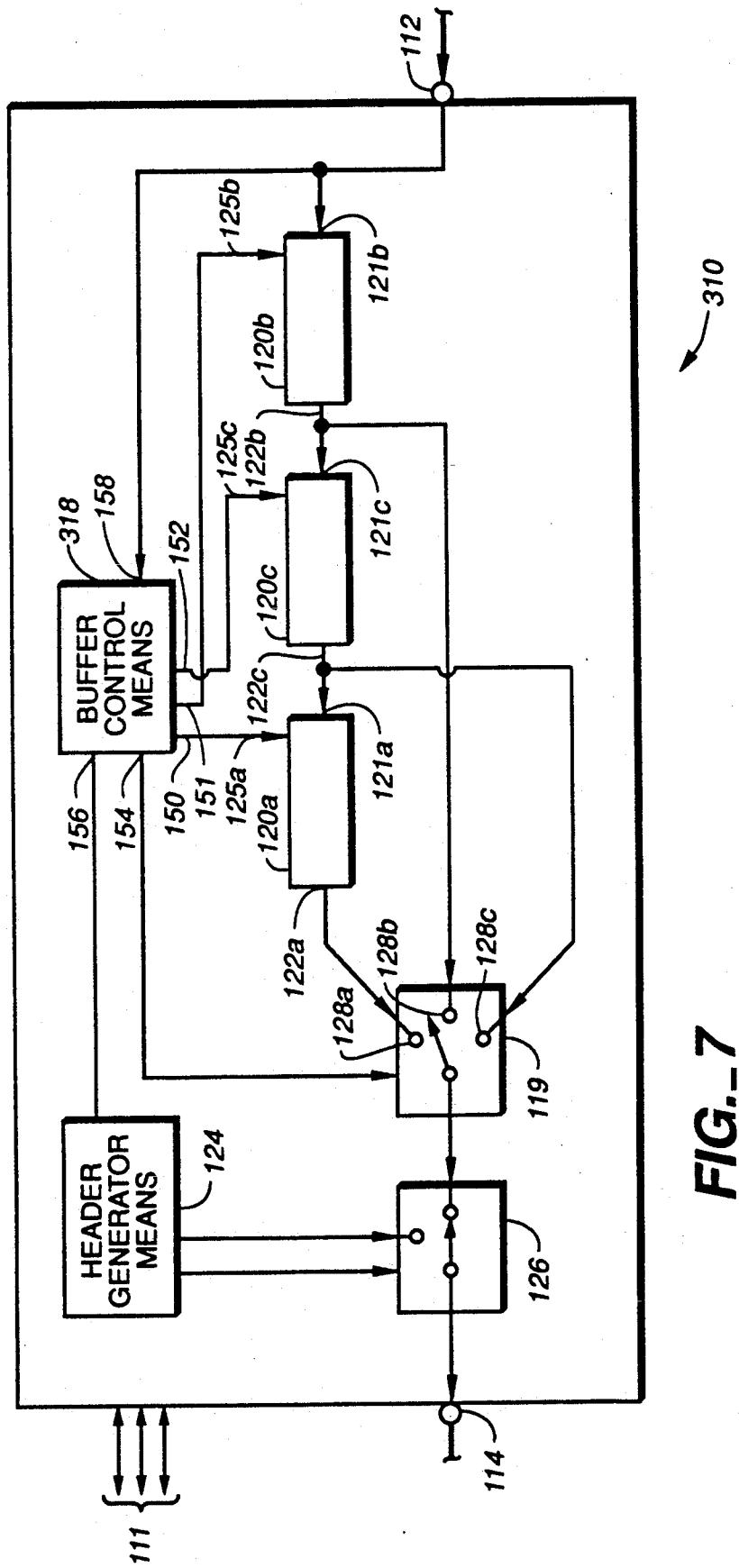
FIG._7

MULTIPLE BUFFER TIME DIVISION MULTIPLEXING RING

FIELD OF THE INVENTION

The present invention relates to time-division-multiplexing (TDM) and more particularly to a communication system utilizing a time-division-multiplexing (TDM) ring or loop for linking a plurality of users, e.g. computers, computer programs, computer peripheral devices, Local-Area-Networking (LAN) equipment and Wide-Area-Networking (WAN) equipment.

BACKGROUND OF THE INVENTION

There are numerous communication systems wherein a plurality of users communicate with each other on a communications loop or ring. For the purpose of this discussion, the term "user" encompasses the computers, the peripheral input/output devices, the computer terminals and the various interfacing equipment that may be found in a computing environment. A major problem in the prior art arises when a large number of users having different delay constraints are linked together in a network for sending and receiving data. For example, difficulties arise when one combines on a network high-speed digital data communications between computers and a relatively low-speed digitized voice connection. It is difficult to combine high-speed data and low-speed data when users with different transmission-delay constraints are linked in a loop configuration.

More specifically, the users of a TDM ring are divided into groups, each of which is represented on the ring by a node. Generally, users that are located in close proximity to one another are grouped together. The nodes of the ring are arranged in a loop such that information flows from one node to the next and in one direction around the loop. A transmission medium is used to physically link the nodes and each node has one input port and one output port for the ring. Within a group, each user of the group is physically linked to the node in such a way that information flows to and from the user and the node through a transmission medium.

In the TDM ring framework, there are no direct physical links between users. The flow of information between users is routed through the appropriate nodes that lie between the users. The routing comprises an indirect link between users and is termed a "connection" for the purpose of this discussion. Various techniques, or protocols, have been formulated to initiate such connections between users, manage the information flow in the connections, and terminate connections. These protocols generally organize the information flowing in each connection into packets and provide a means for identifying each packet, e.g., giving each packet an address label, that allows the packet to be routed to the correct destination.

Important attributes of a connection are connectivity type, information bandwidth, and packet-delivery time. Of the connectivity-types, point-to-point and multipoint connections are two examples. The first is a connection between two users wherein information flows to and from each user and the second is a connection in which the information flows from one user to several other users in a one-way direction. The bandwidth of the connection refers to the amount of information that flows through the connection during a given amount of time. The packet-delivery time refers to the time it takes for a packet to reach its destination. This time can range in value, depending on the number of users seeking access to the TDM ring. Generally, the information in a communication system is managed by allowing each connection a certain number of packets to be routed in a given amount of time. In the generic TDM system, a number of time-slots are grouped together to form a frame. Each time-slot has a specific location in the frame and carries one packet of information for a specific connection. The frame is continuously repeated around the ring whereby new data is supplied in each time-slot during each frame repetition. For a point-to-point connection between two users, both a packet from the first user to the second user and a response packet from the second user to the first user can be sent within one frame.

One node is temporarily or permanently assigned the responsibility of preserving the time-slot order and the integrity of the frame on the ring. The node is usually referred to as the master node and all other nodes are correspondingly referred to as slave nodes.

Each node contains mapping information which, on a temporary or permanent basis, associates each time-slot with data to be transmitted to or received from a particular user. The combined mapping information in all nodes determines the logical connections established throughout the ring. Such connections may be either point-to-point or multipoint.

Conventionally, the master node contains a first-in-first-out (FIFO) buffer memory, the input of which is connected to the receive port of the master node, and the output of which is connected to the transmit port. A number of consecutive time-slots are stored in the buffer. The master node selects the number of time-slots such that data received on a particular time-slot location in the received frame is transmitted on the same time-slot location in the transmitted frame. In some systems, the master node will hold up the transmission of time-slots so as to preserve the integrity of a given frame being transmitted from the master node onto the ring. Accordingly, the number of time-slots stored in the buffer may vary with time and system configuration.

The time delay from when a node transmits a particular time-slot to when the same node is again ready to transmit the same time-slot is often defined as the latency of the ring or, simply, the ring latency. The definition holds for both master nodes and slave nodes. Although the above definition is stated in terms of time-delay, ring latency can be measured in time-slots and in frames as well (i.e., the number of time-slots or frames encountered between transmission and reception). The latency of the ring can be divided into two different components. The first component is the transmission latency and it is defined as the time a particular time-slot spends in the transmission medium that links the nodes and the time it spends in all the slave nodes. The second component is the buffer latency and it is defined as the time spent in the FIFO buffer of the master node.

In a typical TDM ring, the master node will adjust the number of time-slots stored in its FIFO buffer so as to make the ring latency equal to an integer number of frames. The master node will use the FIFO buffer to compensate for any fractional amount in the above defined first component of latency by delaying the transmission of the next time-slot from the FIFO buffer. The incorporation of latency compensation into the ring increases the utilization of the ring and the adjustment of the ring latency to an integer number of frames insures that no time-slots are lost on the ring.

The repetition rate of the frame around the ring is determined by the transmission time allowed for a time-slot multiplied by the total number of time-slots. The resulting bandwidth of a connection on the TDM ring is one packet per frame period (for example, see FIG. 3). The delay incurred in delivering a packet for a given connection will range from one time-slot-transmission delay to the latency of the ring (usually one or two frame periods), depending upon when the information was delivered to the node with respect to the position of the frame and where the particular source and destination nodes are located on the ring. For the successful transfer of information, a connection often will require that at least a predetermined minimum amount of bandwidth be provided, or that no more than a certain amount of delay occur between adjacent packets for a given connection, or both of these specified amounts.

The utility and success of a TDM ring not only depends on the ability of the system to provide successful connections given the delay tolerance of ring users but also on the ability of the system to support a large volume of connections for system flexibility. A major problem arises in the prior art in meeting these two conflicting goals. In the prior art, providing high bandwidth and short packet delays requires a short frame. A short frame, however, limits the total number of time-slots and, hence, connections. Thus, combining a large number of high-speed and low-speed connections, each having different transmission-delay requirements, in a TDM ring is difficult.

For example, a frame may include a plurality of contiguous time-slots, 1-N, for carrying data and a header, H, for marking the beginning of each frame. The header carries a prearranged data pattern and is used by each node to identify the individual time-slots by counting the number of time-slots received after receipt of the header. Since the support of each connection requires one or more time-slots, a frame containing many time-slots will allow a larger number of connections to be supported. However, a long frame containing many time-slots will result in higher ring latency or delay. Conversely, a short frame containing fewer time-slots will enable a smaller number of devices to be connected to the ring. However, a short frame has the advantage of reducing the ring latency.

To increase the bandwidth for a specific connection, one method in the prior art allocates more than one time-slot per frame for one or more given connections. The additional allocation leads to greater bandwidth for the connection when the protocol for the information flow does not need an acknowledgment from the destination user within one ring latency delay (e.g., batch file-transfer operations). Protocols requiring acknowledgments in less than one frame delay will not benefit from additional time-slots per connection as these protocols must wait one frame delay for the acknowledgment from the destination user.

In one case, the addition of time-slots dedicated to a specific connection also serves to reduce the delivery time for a packet. In a point-to-point connection where the first user is closer to the transmit port of the master node than the second user, the first user can use the additional time-slots per frame to reduce the packet-delivery time to the second user. The corresponding response packets from the second user, however, pass through the FIFO buffer of the master node and are delayed by a significant amount of time, up to an amount equal to the ring latency. The additional time-slots reduce packet-delivery times in one direction but not in the other. Therefore, combining a large number of high-speed and low-speed connections, each having different transmission-delay requirements, in a TDM ring remains as a difficult task.

SUMMARY OF THE INVENTION

Broadly stated, the invention encompasses a master node for controlling the flow of information on a time-division-multiplexing ring. The ring has a plurality of slave nodes connected thereto and each slave node enables data transfers between the ring and one or more ring users so that information can be conveyed between all ring users. The ring has a plurality of time-slots wherein each time-slot is enabled to contain a packet of data and to have a delay-status designation of delay-sensitive when said time-slot is conveying information for a delay-sensitive ring user and have a delay-status designation of non-delay-sensitive when said time-slot is conveying information for a non-delay-sensitive ring user. One or more of the time-slots are allocated to each ring user for said data transfer.

The master node comprises one or more first buffer means and a second buffer means. Each buffer means has a storage means for storing time slots in a first-in-first-out (FIFO) arrangement, an input port for coupling time-slots into said storage means and an output port for coupling time-slots out of said storage means. Each buffer means shifts the time-slots contained therein through its storage means when a time-slot is received at its input port. Each first buffer means has a capacity to store at least one time-slot and the second buffer means has a capacity to store a number of time-slots greater than the capacity of the first buffer means.

The master node further comprises an input means for coupling time-slots from the ring into the input ports of the first buffer means and the second buffer means. Additionally, an output switch means is included to couple the time-slots from the first and second buffer means to the ring. The output switch means couples the output of the first buffer means to the ring when a time-slot from the first buffer means is to be transmitted onto the ring and couples the output of the second buffer means to the ring when a time-slot from the second buffer means is to be transmitted onto the ring. Included is means for allocating on the ring the delay-sensitive time-slots such that when a delay-sensitive time-slot appears on the output port of the first buffer means it is coupled by the output-switch means to the ring without loss of non-delay-sensitive time-slot information stored in the second buffer means. Each delay-sensitive time-slot is advanced thereby on the ring to a predetermined next delay-sensitive time-slot past a plurality of time-slots being stored in the second buffer means.

In this way, the invention allows time-slots allocated to certain connections to be advanced ahead of other time-slots during each pass through the master node so as o support delay-sensitive communication users.

Accordingly, it is an object of the present invention to provide an improved data communication system which enables delay-sensitive protocols to use the communication system concurrently with non-delay-sensitive protocols.

It is another object of the present invention to enable different user types using various communication protocols with different delay constraints to use a time-division-multiplexing ring simultaneously while at the same time maximizing the number of connections which may be supported by the ring.

These and other objects of the present invention will become apparent to those skilled in the art from the following detailed description of the invention and from the accompanying drawings.

BRIEF DESCRIPTION OF THE DRAWINGS

FIG. 1 is a block diagram showing an exemplary application of a time-division-multiplexing ring in accordance with the present invention.

FIG. 2 is a block diagram showing one embodiment of a time-division-multiplexing ring according to the present invention.

FIG. 3 is a schematic diagram of a frame of sequential time-slots.

FIG. 4 is a block diagram of a slave node according to the present invention.

FIG. 5 is a block diagram showing another embodiment of the master node according to the present invention.

FIG. 6 is a block diagram showing another embodiment of the master node according to the present invention.

FIG. 7 is a block diagram showing yet another embodiment of the master node according to the present invention.

DETAILED DESCRIPTION OF THE INVENTION

A typical application of the master node in a time-division-multiplexing ring configuration is shown in FIG. 1. In accordance with the present invention, a master node 10 interfaces with various devices for processing digital data. For example, computers A, B and a mini-computer are connected according to well known techniques to master node 10 through a plurality of input/output ports 11 for carrying data. Master node 10 has a data receiving port 12 and a data transmission port 14 for receiving and transmitting, respectively, data in serial form to a plurality of slave nodes 1 through m which are connected in a ring configuration with master node 10 through a communication medium 16. Communication medium 16 may employ optical fiber technology or may be a coaxial cable or twisted pair or the like. Master node 10 sets the clock for the bit rate on the ring. All slave nodes 1-m synchronize to the clock set by master node 10.

Referring now to FIG. 2, a time-division-multiplexing data communication system according to a preferred embodiment is shown wherein master node 10 is connected through communication medium 16 with one or more serially connected slave nodes 1 through m. Each slave node has a serial data receiving port R and a serial data transmission port T. The slave nodes are connected to form a ring wherein data transmission port 14 of master node 10 connects to the serial data receiving port R of a first slave node 1 and the serial data transmission port T of the first slave node 1 is connected to the serial data receiving port R of a succeeding slave node 2. Thereafter, each slave node has its serial data transmission port T connected to the serial data receiving port R of a succeeding slave until the ring is closed by the serial data transmission port T of a last slave node m being connected to data receiving port 12 of master node 10. As described above, master node 10 also has a plurality of input/output ports 11 which may be connected to one or more computers or digital devices according to well known techniques. Data that is input to input/output ports 11 is converted in master node 10 to serial data for transmission on the ring, and conversely serial data from the ring is converted to data for transmission to computers or other digital devices connected to input/output ports 11 of master node 10. Likewise, the slave nodes have data ports 17 for receiving data from and transmitting data to one or more digital devices (not shown) associated with each slave node.

Referring now to FIG. 3, digital data are allocated to time-slots, T1, T2, T3, ... TN. The time-slots preferably travel around the ring in a group called a frame 23, which repeats over and over again. One or more frames 23 may be traveling around the ring at any given time, depending on the system. Frame 23 may contain many time-slots T1, T2 ... TN. The multiplexing aspect of the ring according to the present invention operates by allocating specific time-slots for each connection to a remote terminal or digital device on the ring. To distinguish one time-slot from another, a unique bit pattern is inserted into one of the time-slots of the frame. This unique time-slot is called the frame header $H_F$ as shown in FIG. 3. The frame header $H_F$ is always in the same position in every frame. Once the frame header $H_F$ is recognized by the slave nodes 1 through m, it results in the correct mapping of the packet of data in each time-slot T1, T2 ... TN to its corresponding destination at a digital device connected to a slave node.

Each of the time-slots in frame 23 has a particular status. If the time-slot is conveying information for a delay-sensitive user of the ring, it will have a delay-status designation of delay sensitive. Conversely, when the time-slot is conveying information for a non-delay-sensitive ring user, the delay-status designation of that time-slot is non-delay sensitive. As will be described in greater detail below, the present invention allows a user to interconnect and service on the time-division-multiplexing ring a combination of non-delay-sensitive devices and delay-sensitive devices at remote locations.

Details of the operation of the multiplexing ring 1 may be explained with reference to FIGS. 2, 4 and 5. In order to give the multiplexing ring the capability to support arbitrary connections, the ring must contain an exact integer number of frames. Since the distances between the slave nodes 1-m are different in every installation, a buffer-control means 18, shown in FIG. 2, is used in master node 10 to provide for the synchronization of incoming and outgoing frames. Buffer control means 18 monitors the flow of time-slots on the ring via input port 58 and generates a set of control signals via control ports 50, 51, 54 and 56, as discussed below. Master node 10 further comprises one or more parallel buffer means 20a, 20b for receiving digital data from a plurality of slave nodes 1 through m. In a preferred embodiment, parallel buffer means 20a, 20b comprise first-in-first-out buffers for accumulating data having different delay constraints. Preferably, the parallel buffers include a long buffer means 20a for containing a plurality of time-slots for non-delay-sensitive data and short buffer means 20b for containing a plurality of time-slots for receiving delay-sensitive data that can be advanced ahead of the data stored in long buffer means 20a.

In operation, incoming time-slots at the data receiving port 12 of master node 10 are inserted simultaneously into long buffer means 20a and short buffer means 20b at corresponding input ports 21a, 21b of the parallel buffers means 20a, 20b, respectively. Each parallel buffer means 20a, 20b, has a corresponding output port 22a, 22b. Output ports 22a, 22b of parallel buffers means 20a, 20b are connected to an output switch means 19. Long buffer means 20a or short buffer means 20b are selected by output switch means 19 according to the data to be output onto the ring. Output switch means 19 is preferably a two pole single throw switch having a pole 28a and pole 28b which are connected, respectively, to corresponding output ports of long buffer means 20a and short buffer means 20b. Output switch means 19 is controlled by buffer control means 18 via control port 54 for selectively outputting the contents of parallel buffer means 20a or 20b in serial form at data transmission port 14 of master node 10.

For example, output switch means 19 may be selectively connected to output port 22a of long buffer 20a for outputting the contents of long buffer means 20a when time-slots associated with non-delay-sensitive data are to be transmitted. Output switch means 19 may be selectively connected to output port 22b of short buffer means 20b for outputting the contents of short buffer means 20b when time-slots associated delay-sensitive data are to be transmitted. In each case, the output from output switch means 19 is coupled to the ring where communication medium 16 is connected to transmission port 14 of master node 10. Owing to the difference in storage capacity between long buffer means 20a and short buffer means 20b, delay-sensitive data in short buffer means 20b can be advanced ahead of data in long buffer means 20a.

In one preferred embodiment of the present invention, each of the buffer means adjusts its storage capacity to accommodate short-term differences between time-slot reception and transmission rates to and from master node 10. The adjustment is facilitated by two buffer-control signals generated by buffer control means 18 at control ports 50 and 51 that are coupled to a send-enable port 25a of long buffer means 20a and to a send-enable port 25b of short buffer means 20b, respectively. If the buffer-control signals at send-enable ports 25a and 25b are low, each buffer will increase its storage capacity by one time-slot for each time-slot received at its input port which is not compensated for by an out-going time-slot. If the buffer-control signals at send-enable ports 25a and 25b are high, each buffer will decrease its storage capacity by one time-slot for every time-slot sent which is not compensated for by an incoming time-slot. The adjusting of the storage capacity in each buffer allows the master node to set the ring latency to an integer number of frames, which maximizes the utilization of the ring while insuring the integrity of the individual time-slots.

In order to not lose any data in the master node, it is required that each time-slot in the received frame is selected once and only once by the switch means, from either buffer. This can, for example, be accomplished if:

1. The assignment of delay-sensitive time-slots for a specific use is periodic with a period of N2 time-slots, where N2 is an integer greater than one. One can characterize this period as a sub-frame, with one or more such sub-frames making up the frame.

2. The frame has a length N1 which is an integer multiple of N2.

3. The short buffer means in the master node adjusts its storage capacity such that the ring latency for delay-sensitive time-slots is an integer multiple of N2 time-slots, with the integer multiple being greater than zero.

4. The long buffer means in the master node adjusts its storage capacity such that the ring latency for non-delay-sensitive time-slots is an integer multiple of N1, with the integer multiple being greater than zero.

As an example, consider a time-division-multiplexing ring having a ring latency of one frame and a transmission latency of less than ten time-slots. The frame has $N1 = 1000$ time-slots with a sub-frame period of $N2 = 10$ time-slots. If support of delay-sensitive connections is not required, a total of 1000 connections with a transmission capacity of one time-slot per frame and a delay of 1000 time-slots can be supported. If support of a single delay-sensitive connection is required, one time-slot in each sub-frame period may be assigned for this connection, giving this connection a capacity of 100 time-slots per frame and a delay of 10 time-slots. The remaining time-slots can be used to support 900 connections with a capacity of one time-slot per frame with a maximum delay of 1000 time-slots. Similarly, with 2 delay-sensitive connections a total of 800 non-delay-sensitive connections can be supported, etc.

In practice, a number of control time-slots having a non-periodic placement within the frame are used in the time-division-multiplexing ring to perform certain ring maintenance tasks (e.g. initiating new message connections or channels or terminating existing message connections). Also in practice, the total number of time-slots may vary with the load demand of the ring. Several techniques in compensating for the addition of control time-slots and for the variable number of time-slots are known within the ordinary skill of the art. For example, the control time-slots may be accommodated by counting the number of time-slots with respect to the header, tracking the locations of control time-slots, and adjusting the storage size of the first and second buffer means accordingly. Alternatively, control time-slots may be treated as non-delay-sensitive time-slots and allocated within the frame such that the frame contains an integer number of sub-frames. The variable number of time-slots may be accommodated by adjusting the storage size of the first and second buffer means or, alternatively, by padding the frame with a number of blank or control time-slots such that the frame contains an integer number of time-slots. For these examples, buffer control means 18 may further comprise a microprocessor and memory means connected in a conventional manner.

In another embodiment of the present invention, the storage capacities of long buffer means 20a and short buffer means 20b are not adjusted for short term differences between the time-slot reception and transmission rates to and from master node 10. As a consequence, each buffer means transmits a time-slot at its output port only when it receives a time-slot at its input port. In some applications for this embodiment of the present invention, the number and distribution of delay-sensitive time-slots and non-delay-sensitive time-slots are fixed and, consequently, the storage capacities of long buffer means 20a and of short buffer means 20b can be fixed at constant values in accordance with the following constraints:

1. The assignment of delay-sensitive time-slots for a specific use is periodic with a period of N4 time-slots, where N4 is an integer greater than one. One can characterize this period as a sub-frame, with one or more such sub-frames making up the frame.

2. The frame has a length N3 which is an integer multiple of N4.

3. The storage capacity of the short buffer means in the master node is fixed at an integer multiple of N4 time-slots, with the integer multiple being greater than zero.

4. The storage capacity of the long buffer means in the master node is fixed at an integer multiple of N3, with the integer multiple being greater than zero.

The above example for the adjustable buffer embodiment is also applicable to this embodiment of the present invention with exemplary values of N1-N4 being as follows: N3=N1=1000 and N4=N2=10.

In master node 10, a header-generator means 24 is provided for generating a frame header. Header-generator means 24 generates a unique bit pattern which is inserted into the first time-slot in the frame and is responsive to control port 56 of buffer control means 18. Header generator means 24 has two output leads coupled with a header-switch means 26 for selectively generating a bit pattern in a time-slot provided by the parallel buffer means 20a or 20b, as selected by output switch means 19. One output lead from header generator means 24 generates the header and the other output lead operates header-switch means 26.

The present invention can be expanded to utilize more than two parallel buffer means. For example, a sub-master node 110 shown in FIG. 5 uses three buffer means: long buffer means 120a, short buffer means 120b and medium buffer means 120c. The characterization of delay sensitivity is correspondingly expanded to three delay-status levels: low-delay sensitive, medium-delay sensitive and high-delay sensitive. The low-delay sensitive level corresponds to the non-delay sensitive level, the high-delay sensitive level corresponds to the delay-sensitive level, and the medium-delay sensitive level is an addition level having a delay-status level between the non-delay-sensitive and delay-sensitive levels.

With exception of elements, 118, 119, 120c, 121c, 122c, 125c, 128c and 152, each element of master node 110 is the same as a corresponding element of master node 10 where the number designation for each element of master node 110 is equal to the number designation of the corresponding element in master node 10 plus a value of one-hundred. Master node 110 has a plurality of input/output ports 111 which are identical to the input/output ports 11, has a data receiving port 112 identical to data receiving port 12, has data transmission port 114 identical to data transmission port 14, has header-generator means 124 identical to header-generator means 24, has header-switch means 126 identical to header-switch means 26, has associated buffer elements 120a, 121a, 122a, and 125a which are identical to to elements 20a, 21a, 22a, and 25a respectively, and has associated buffer elements 120b, 121b, 122b, and 125b which are identical to to elements 20b, 21b, 22b, and 25b respectively.

Master node 110 has a buffer control means 118 which corresponds to buffer control means 18 and has the functionality of buffer control means 18 plus the ability to control time-slots from an additional parallel buffer means 120c. Master node 110 has an output switch means 119 which corresponds to output switch means 19 and has the functionality of output switch means 19 plus the ability to select time-slots from an additional parallel buffer means 120c via pole 128c. The buffer control means 118, output switch means 119 and the above identical elements are coupled to one another in master node 110 as their corresponding counterparts are coupled in master node 10.

In addition, master node 110 has a medium buffer means 120c having input port 121c which couples time-slots in from the ring via data-receiving port 112, an output port 122c which couples time to the ring via pole 128c of output switch means 119, and a send-enable port 125c coupled to control port 152 of buffer control means 118.

In master node 110, medium-delay-sensitive time-slots are advanced on the ring past low-delay-sensitive time-slots and high-delay-sensitive time-slots are advanced on the ring past both medium-delay-sensitive and low-delay-sensitive time-slots. To facilitate the additional modes of time-slot advancement, the sub-frame organization of the two buffer case is generalized to an overlay organization comprising two sets of overlays. Like the sub-frame, each overlay set partitions the frame into a number of smaller groups of contiguous time-slots called overlays, or time-slot groups. The number of time-slots in an overlay is the same for all overlays of the same set. Each set, however, partitions the frame with a different number of overlays and the overlays of different sets have different numbers of time-slots. The total number of time-slots overlaid by each set, however, is the same and equal to the total number of time-slots in each frame. Unlike the sub-frame organization, each time-slot is covered by two overlays, one from each set. For example, the first set may partition the frame into two overlays, each overlay covering six contiguous time-slots for a total of twelve time-slots in the frame. The second set may partition the frame into three overlays, each overlay covering four contiguous time-slots for a total of twelve.

In master node 110, one set of overlays is designed to handle medium-delay-sensitive time-slots and the second set of overlays is designed to handle high-delay-sensitive time-slots. For the purposes of discussion, the former set will be referred to as the medium set and the latter set will be referred to as the high set. The high set will partition the frame into a greater number of overlays than the medium set. Medium buffer means 120c is then used to advance medium-delay-sensitive time-slots on the ring by a selected number of overlays of the medium set in a manner similar to the advancement of delay-sensitive time-slots in master node 10. Short buffer means 120b is used to advance high-delay-sensitive time-slots on the ring by a selected number of overlays of the high set in a manner similar to the advancement of delay-sensitive time-slots in master node 10. The low-delay-sensitive time-slots are not advanced within the frames. Since the number of time-slots in each overlay of the high set is smaller than the number of time-slots in each overlay of the medium set, the high-delay-sensitive data in short buffer means 120b can be advanced sooner than the medium-delay-sensitive data in medium buffer means 120c.

By adding more parallel buffer means, delay-sensitive designations and sets of overlays, the flexibility of master node 110 can be increased to handle a greater range of delay-sensitive requirements, while maintaining maximum utilization of the time-slots on the ring. As with the two buffer system embodied by master node 10, parallel buffer means 120a, 120b and 120c may be of the fixed or adjustable type.

Another embodiment of the master node is shown at 210 in FIG. 6. As seen in FIG. 6, master node 210 includes three additional switches 270a, 270b and 270c. These additional switches are used to selectively couple data-receiving port 112 to the inputs of multiple buffers 120a, 120b and 120c. Master node 210 includes a buffer control means 218 which has the functionality of buffer control means 118 shown in FIG. 5, plus the ability to control the three switches 270a, 270b and 270c via control outputs 260, 262 and 264, respectively. Input switch means 270a selectively couples time-slots from data-receiving port 112 to long buffer means 120a, input switch means 270b selectively couples time-slots from data-receiving port 112 to short buffer means 120b, and input switch means 270c selectively couples time-slots from data-receiving port 112 to medium buffer means 120c.

With the exception of elements 218, 260, 262, 264, 270a, 270b and 270c, each element of master node 210 is the same as a corresponding element of master node 110 where the number designation for each element of master node 210 is equal to the number designation of the corresponding element in master node 110.

In master node 210, there are no changes in the delay-status designations as defined above with respect to the operation of master node 110. As in the case of master node 110, in the exemplary embodiment shown in FIG. 6 medium-delay-sensitive time-slots are advanced on the ring past low-delay-sensitive time-slots and high-delay-sensitive time-slots are advanced on the ring past both medium-delay-sensitive and low-delay-sensitive time-slots in master node 210. The additional input switch means 270a, 270b and 270c allows master node 210 to efficiently use the storage of the multiple buffer means, such as by not storing a time-slot in more than one buffer. Master node 210 thus provides to one of ordinary skill in the art a certain level of flexibility as to ring functionality insofar as time slots are organized and prioritized in each frame.

Yet another embodiment of the master node is shown at 310 in FIG. 7. As seen in FIG. 7, in master node 310 the interconnection of long buffer means 120a, short buffer means 120b and medium buffer means 120c has been changed from a parallel topology to a serial topology. Input port 121b of short buffer means 120b is coupled to data-receiving port 112 and the output port 122b of short buffer means 120b is coupled to input port 121c of medium buffer means 120c and to pole 128b of output switch means 119. Output port 122c of medium buffer means 120c is coupled to input port 121a of long buffer means 120a and to pole 128c of output switch means 119. As in master node 110, output port 122a is coupled to pole 128a of output switch means 119 and control ports 150, 151 and 152 are coupled to send-enable ports 125a, 125b and 125c respectively. The serial topology of buffer means 120a, 120b and 120c may be equivalent viewed in the art as one long buffer means having two internal tap points from which time-slots may be coupled from. Furthermore, it is within the ordinary skill in the art to substitute other buffer means having any number of tap points to enable construction of a variety of different lengths equivalent buffers.

In master node 310, there are no changes in the delay-status designations as defined above with respect to the operation of master node 110. As in the case of master node 110, in the example shown in FIG. 7 medium-delay-sensitive time-slots are advanced on the ring past low-delay-sensitive time-slots and high-delay-sensitive time-slots are advanced on the ring past both medium-delay-sensitive and low-delay-sensitive time-slots in master node 310. As with master node 210, additional input switch means similar to input switches 270a and 270c may be added to master node 310 at the input ports of long buffer means 120a and medium buffer means 120c, respectively, to further increase the flexibility and efficiency of use of the storage elements in buffer means 120a and 120c Master node 310 thus provides to one or ordinary skill in the art further flexibility.

The frames of sequential data that are transmitted from master node 10, 110, 210 or 310 onto the multiplexing ring by data transmission port 14 are applied to the data receiving node R of slave node 1 of the serially linked slave nodes. The elements of an exemplary slave node 30 according to the present invention is shown in FIG. 4. Thus, in slave node 1, for example, the output time-slots from data transmission port 14 are received by header detector means 36, which detects the header in each frame. The header detector means 36 has a connection to a drop/insert control means 38, which controls switch 35 and I/O converter 37 in such a way that time-slots not used for connections associated with slave node 1 pass through the node unaffected, while time-slots used for connections associated with slave node 1 are exchanged with I/O converter 37. I/O converter 37 converts the time-slot data to user data in accordance with known techniques. I/O converter 37 has a series of input/output connections to peripheral digital devices 40 or the like connected to slave unit 1.

Input/output ports 1 of the master node in FIG. 2 exchange data with time-slots on the ring using equivalent means as used in the slave nodes (not shown).

It will be appreciated that the multiple buffer time-division-multiplexer ring according to the present invention enables different computers using various communication schemes with different delay constraints to use the communication ring simultaneously while at the same time maximizing the number of the connections which may be supported by the ring. Thus, for example, delay-sensitive interfaces such as Ethernet or IBM 3270 may be accommodated by using many time-slots while non-delay-sensitive interfaces may use a single or a minimum number of time-slots in a single frame.

While the invention has been described in connection with what is presently considered to be the most practical and preferred embodiments, it is to be understood that the present invention is not limited to the disclosed embodiment but, on the contrary is intended to cover various modifications and equivalent arrangements included within the scope of the appended claims.

What is claimed is:

1. A master node for controlling the flow of information on a time-division-multiplexing ring having a plurality of slave nodes connected thereto, each said slave node for enabling data transfer between said ring and one or more ring users, said ring having a plurality of time-slots wherein each said time-slot is enabled to contain a packet of data and to have a delay-status designation of delay sensitive when said time-slot is conveying information for one or more delay-sensitive ring users and have a delay-status designation of non-delay sensitive when said time-slot is conveying information for one or more non-delay-sensitive ring users, and wherein one or more of said time-slots are allocated to each said ring user for said data transfer, said master node comprising:

a first buffer means having an input port, an output port and storage means for storing said time-slots in a first-in-first-out arrangement, said input port coupling said time-slots into said storage means and said output port coupling said time-slots out of said storage means, said storage means having a capacity for storing at least one said time-slot, said first buffer means shifting said time-slots contained therein through said first buffer means when said input port of said first buffer means receives a next said time-slot;

a second buffer means having an input port, an output port and storage means for storing said time-slots in a first-in-first-out arrangement, said input port of said second buffer means coupling said time-slots into said storage means of said second buffer means and said output port of said second buffer means coupling said time-slots out of said storage means of said second buffer means, said storage means of said buffer means having a capacity for storing a predetermined number of said time-slots greater than said storage means capacity of said first buffer means, said second buffer means shifting said time-slots contained therein through said second buffer means when said port of said second buffer means receives a next said time-slot;

an input means for coupling said time-slots from said ring into said input ports of said first buffer means and said second buffer means; and an output-switch means for coupling out to said ring a time-slot output from said output port of said first buffer means when a time-slot from said first buffer means is to be transmitted onto said ring and for coupling out to said ring a time-slot output from said output port of said second buffer means when a time-slot from said second buffer means is to be transmitted onto said ring, including means for allocating on said ring the delay-sensitive time-slots such that when a delay-sensitive time-slot appears on said output port of said first buffer means it is coupled by said output-switch means to said ring without loss of non-delay-sensitive time-slot information stored in said second buffer means, each said delay-sensitive time-slot being advanced thereby on said ring to a predetermined next delay-sensitive time-slot past a plurality of time-slots being stored in said second buffer means.

2. The master node of claim 1 wherein said input means causes said time-slots from said ring to be simultaneously coupled to said input ports of said first buffer means and said second buffer means.

3. The master mode of claim 1 wherein said input means includes switch means for selectively coupling time-slots from said ring to the input port of one of said first and second buffer means.

4. The master node of claim 1 wherein said first buffer means and said second buffer means comprise a single serial buffer means with multiple tap points, the output port of each of said first and second buffer means comprising a selected one of said tap points.

5. The master node of claim 1 wherein each said delay-sensitive time-slot contained in said first buffer means is advanced on said ring to a predetermined next delay-sensitive time-slot past a plurality of time-slot being stored in said second buffer means an amount equal to the difference in the number of time-slots stored in each of said first and second buffer means.

6. The master node of claim 1 including means for enabling each node to keep track of the relative position on said ring of each said packet of data.

7. The master node of claim 6 including means for organizing said time-slots on said ring as one or more frames, each frame including a specified number of time-slots and header means for defining the start of each frame.

8. The master node of claim 7 wherein said header means comprises a predetermined one of said time-slots.

9. The master node of claim 1 wherein said first buffer means comprises means for causing said storage means of said first buffer means to store a variable number of said time-slots up to the maximum of said storage means capacity of said first buffer means and wherein second buffer means comprises means for causing said storage means of said second buffer means to store a variable number of said time-slots up to the maximum of said storage means capacity of said second buffer means.

10. A master node for controlling the flow of information on a time-division-multiplexing ring having a plurality of slave nodes connected thereto, each said slave node for enabling data-transfer between said ring and one or more ring users, said ring having a plurality of time-slots wherein each said time-slot is enabled to contain a packet of data and to have a delay-status designation of delay-sensitive when said time-slot is conveying information for one or more delay-sensitive ring users and have a delay-status designation of non-delay-sensitive when said time-slot is conveying information for one or more non-delay-sensitive ring users, and wherein one or more of said time-slots are allocated to each said ring user for said data transfer, said master node comprising:

a first buffer means having an input port, an output port and storage means for storing said time-slots in a first-in-first-out arrangement, said input port coupling said time-slots into said storage means and said output port coupling said time-slots out of said storage means, said storage means having a capacity for storing at least one said time-slot, said first buffer means shifting said time-slots contained therein through said first buffer means when said input port of said first buffer means receives a next said time-slot;

a second buffer means having an input port, an output port and storage means for storing said time-slots in a first-in-first-out arrangement, said input port of said second buffer means coupling said time-slots into said storage means of said second buffer means and said output port of said second buffer means coupling said time-slots out of said storage means of said second buffer means, said storage means of said second buffer means having a capacity for storing a predetermined number of said time-slots equal to an integer multiple of said storage means capacity of said first buffer means, said integer multiple having a value of at least two, said second buffer means shifting said time-slots contained therein through said second buffer means when said input port of said second buffer means receives a next said time-slot;

an input means for coupling said time-slots from said ring into said input ports of said first buffer means and said second buffer means, wherein said first buffer means and said second buffer means receive said time-slots from said ring simultaneously; and an output-switch means for coupling out to said ring a time-slot output from said output port of said first buffer means when a time-slot from said first buffer means is to be transmitted onto said ring and for coupling out to said ring a time-slot output from said output port of said second buffer means when a time-slot from said second buffer means is to be transmitted onto said ring, including means for allocating on said ring the delay-sensitive time-slots such that when a delay-sensitive time-slot appears on said output port of said first buffer means it is coupled by said output-switch means to said ring without loss of non-delay-sensitive time-slot information stored in said second buffer means, each said delay-sensitive time-slot being advanced thereby on said ring to a predetermined next delay-sensitive time-slot past a plurality of time-slots being stored in said second buffer means.

11. The master node of claim 10 wherein each said delay-sensitive time-slot contained in said first buffer means is advanced on said ring to a predetermined next delay-sensitive time-slot past a plurality of time-slot being stored in said second buffer means an amount equal to the difference in the number of time-slots stored in each of said first and second buffer means.

12. The master node of claim 10 including means for enabling each node to keep track of the relative position on said ring of each said packet of data.

13. The master node of claim 12 including means for organizing said time-slots on said ring as one or more frames, each frame including a specified number of time-slots and header means for defining the start of each frame.

14. The master node of claim 13 wherein said header means comprises a predetermined one or more of said time-slots.

15. A master node for controlling the flow of information on a time-division-multiplexing ring having a plurality of slave nodes connected thereto, each said slave node for enabling data transfer between said ring and one or more ring users, said ring having a plurality of time slots organized into one or more frames, each said frame comprising at least one sub-frame, and wherein each said time-slot is enabled to contain a packet of data and to have a delay-status designation of delay sensitive when said time-slot is conveying information for one or more delay-sensitive rings users and to have a delay-status designation of non-delay sensitive when said time-slot is conveying information for one or more non-delay-sensitive ring users, each said rub-frame containing at least one said non-delay-sensitive time-slot and a delay-sensitive time-slot for each said delay-sensitive ring user and wherein one or more of said time-slots are allocated to each said ring user for said data transfer, said master node comprising:

a first buffer means having an input port, an output port and storage means for storing said time-slots in a first-in-first-out arrangement, said input port coupling said time-slots into said storage means and said output port coupling said time-slots out of said storage means, said storage means having a capacity for storing at least one said sub-frame of said time slots, said first buffer means shifting said time-slots contained therein through said first buffer means when said input port of said first buffer means receives a next said time-slot;

a second buffer means having an input port, an output port and storage means for storing said time-slots in a first-in-first-out arrangement, said input port of said second buffer means coupling said time-slots into said storage means of said second buffer means and said output port of said second buffer means coupling said time-slots out of said storage means of said second buffer means, said storage means of said second buffer means having a capacity for storing an integer number of sub-frames, said integer number greater than said number of sub-frames stored in said first buffer means, said second buffer means shifting said time-slots contained therein through said second buffer means when said input port of said second buffer means receives a next said time-slot;

an input means for coupling said time-slots from said ring into said input ports of said first buffer means and said second buffer means, wherein said first buffer means and said second buffer means receive said time-slots from said ring simultaneously; and an output-switch means for coupling out to said ring a time-slot output from said output port of said first buffer means when a time-slot from said first buffer means is to be transmitted onto said ring and for coupling out to said ring a time-slot output from said output port of said second buffer means when a time-slot from said second buffer means is to be transmitted onto said ring, including means for allocating on said ring the delay-sensitive time-slots such that when a delay-sensitive time-slot appears on said output port of said first buffer means it is coupled by said output-switch means to said ring without loss of non-delay-sensitive time-slot information stored in said second buffer means, each said delay-sensitive time-slot being advanced thereby on said ring to a predetermined next delay-sensitive time-slot past a plurality of time-slots being stored in said second buffer means.

16. The master node of claim 15 wherein each said delay-sensitive time-slot contained in said first buffer means is advanced on said ring to a predetermined next delay-sensitive time-slot past a plurality of time-slot being stored in said second buffer means an amount equal to the difference in the number of sub-frames stored in each of said first and second buffer means.

17. The master node of claim 15 including means for enabling each node to keep track of the relative position on said ring of each said packet of data.

18. The master node of claim 17 wherein said header means comprises a predetermined one of said time-slots.

19. The master node of claim 15 wherein said storage means capacity of said second buffer means contains one or more said frames, said storage means capacity of said second buffer means being greater than said storage means capacity of said first buffer means.

20. A time-division-multiplexing data-communication system comprising:

a plurality of nodes for providing a connection of one or more users to a plurality of other users on said data-communication system, said nodes comprising a plurality of slave nodes and a master node, each of said nodes comprising a ring-input port, a ring-output port, and a plurality of I/O ports; and a transmission-medium means for linking said nodes in a ring configuration wherein said ring-output port of each said node is linked to said ring-input port of another said node and wherein said ring-input port of each of said node is linked to said ring-output port of another said node, said transmission-medium means linking said nodes such that only one ring linking all said nodes is formed, said ring having a plurality of time-slots wherein each said time-slot is enabled to contain a packet of data and have a delay-status designation of delay sensitive when said time-slot is conveying information for one or more delay-sensitive ring users and have a delay-status designation of non-delay sensitive when said time-slot is conveying information for one or more non-delay-sensitive ring users and wherein one or more of said time-slots are allocated to each said user;

each said master node comprising:

a first buffer means having an input port, an output port and storage means for storing said time-slots in a first-in-first-out arrangement, said input port coupling said time-slots into said storage means and said output port coupling said time-slots out of said storage means, said storage means having a capacity for storing at least one said time-slot, said first buffer means shifting said time-slots contained therein through said first buffer means when said input port of said first buffer means receives a next said time-slot;

a second buffer means having an input port, an output port and storage means for storing said time-slots in a first-in-first-out arrangement, said input port of said second buffer means coupling said time-slots into said storage means of said second buffer means and said output port of said second buffer means coupling said time-slots out of said storage means of said second buffer means, said storage means of said second buffer means having a capacity for storing a predetermined number of said time-slots greater than said storage means capacity of said first buffer means, said second buffer means shifting said time-slots contained therein through said second buffer means when said input port in said second buffer means receives a next said time-slot;

an input means for coupling said time-slots from said ring-input port of said master node into said input ports of said first buffer means and said second buffer means, wherein said first buffer means and said second buffer means receive said time-slots from said ring simultaneously; and an output-switch means for coupling out to said ring-output port of said master node a time-slot output from said output port of said first buffer means when a time-slot from said first buffer means is to be transmitted onto said ring and for coupling out to said ring-output port of said master node a time-slot output from said output port of said second buffer means when a time-slot from said second buffer means is to be transmitted onto said ring, including means for allocating on said ring the delay-sensitive time-slots such that when a delay-sensitive time-slot appears on said output port of said first buffer means it is coupled by said output-switch means to said ring without loss of non-delay-sensitive time slot information stored in said second buffer means, each said delay-sensitive time-slot being advanced thereby on said ring to a predetermined next delay-sensitive time-slot past a plurality of time-slots being stored in said second buffer means.

21. The time-division-multiplexing data-communication system of claim 20 wherein each said delay-sensitive time-slot contained in said first buffer means is advanced on said ring to a predetermined next delay-sensitive time-slot past a plurality of time-slot being stored in said second buffer means an amount equal to the difference in the number of time-slots stored in each of said first and second buffer means.

22. The time-division-multiplexing data-communication system of claim 20 including means for enabling each node to keep track of the relative position on said ring of each said packet of data.

23. The time-division-multiplexing data-communication system of claim 22 including means for organizing said time-slots on said ring as one or more frames, each frame including a specified number of time-slots and header means for defining the start of each frame.

24. The time-division-multiplexing data-communication system of claim 23 wherein said header means comprises a predetermined one or more of said time-slots.

25. The time-division-multiplexing data communication system of claim 24 wherein each said slave node includes:

a header-detector means for detecting said frame header means, said header-detector means including an input port connected to said ring-input of said slave node and an output;

a drop-insert control means for determining if a time-slot received at said ring-input port of said slave node contains data for a user linked to said slave node, said drop-insert control means comprising an input responsive to said output of said header-detector means, a first output and a second output, an I/O converter means for coupling time-slots between said ring and said users linked to said slave node, said I/O converter means including a first input port connected to said ring-input port of said slave node, a ring-output port, a plurality of user-I/O ports for linking one or more said ring users to said slave node, and a second input port responsive to said first output of said drop-insert control means, said converter means having storage capacity for at least one time-slot; and an output-switch means for coupling a time-slot from said ring-input port of said slave to said ring-output port of said ring when a time-slot is to be transmitted through said slave node and for coupling a time-slot from said ring-output port of said I/O converter means to said ring-output port of said slave node when a time-slot from said I/O converter means is to be transmitted onto said ring, said output-switch means responsive to said second output of said drop-insert control means.

26. The master node of claim 20 wherein said first buffer means comprises means for causing said storage means of said first buffer means to store a variable number of said time-slots up to the maximum of said storage means capacity of said first buffer means and wherein second buffer means comprises means for causing said storage means of said second buffer means to store a variable number of said time-slots up to the maximum of said storage means capacity of said second buffer means.

27. The master node of claim 21 wherein said first buffer means comprises means for causing said storage means of said first buffer means to store a variable number of said time-slots up to the maximum of said storage means capacity of said first buffer means and wherein second buffer means comprises means for causing said storage means of said second buffer means to store a variable number of said time-slots up to the maximum of said storage means capacity of said second buffer means.

28. The master node of claim 24 wherein said first buffer means comprises means for causing said storage means of said first buffer means to store a variable number of said time-slots up to the maximum of said storage means capacity of said first buffer means and wherein second buffer means comprises means for causing said storage means of said second buffer means to store a variable number of said time-slots up to the maximum of said storage means capacity of said second buffer means.

29. The master node of claim 25 wherein said first buffer means comprises means for causing said storage means of said first buffer means to store a variable number of said time-slots up to the maximum of said storage means capacity of said first buffer means and wherein second buffer means comprises means for causing said storage means of said second buffer means to store a variable number of said time-slots up to the maximum of said storage means capacity of said second buffer means.

30. A master node for controlling the flow of information on a time-division-multiplexing ring having a plurality of slave nodes connected thereto, each said slave node for enabling data transfer between said ring and one or more ring users, the flow of information between said ring users on said ring being organized into one or more frames, each said frame comprising a plurality of sub-frames, each said sub-frame having a predetermined number of time-slots wherein each said time-slot is enabled to contain a packet of data and to have a delay-status designation of delay sensitive when said time-slot is conveying information for one or more delay-sensitive ring users and to have a delay-status designation of non-delay sensitive when said time-slot is conveying information for one or more non-delay-sensitive ring users, each said frame thereby comprising a number of time-slots equal to the product of said plurality of sub-frames and of said predetermined number of time-slots per sub-frame, said master node comprising:

a data receiving port for coupling time-slots from said ring;

a data transmission port for coupling time-slots onto said ring;

first buffer means having an input port for coupling said time-slots into said first buffer means from said data receiving port, an output port for coupling said time-slots from said first buffer means, and adjustable storage means for storing a variable number of said time-slots up to a predetermined maximum number of said time-slots, said time-slots stored in a first-in-first-out arrangement;

second buffer means having an input port for coupling said time-slots into said second buffer means from said data receiving port, an output port for coupling said time-slots from said second buffer means, and adjustable storage means for storing a variable number of said time-slots up to a predetermined maximum number of said time-slots, said time-slots stored in a first-in-first-out arrangement;

detection means for determining a difference number equal to the total number of time-slots contained in said one or more frames of said ring less the number of time-slots on said ring traveling between said data transmission port and said data receiving port;

means for causing said second buffer means to store a number of time-slots equal to said difference number determined by said detection means;

means for causing said first buffer means to store a number of time-slots equal to said difference number less the number of time-slots held in an integer number of said sub-frames, said integer number such that said number of time-slots stored in said first buffer means is greater than zero; and output switch means couples to said output port of said first and second buffer means for coupling out to said data transmission port a delay-sensitive time-slot from said output port of said first buffer means when a delay-sensitive time-slot appears at said output port of said first buffer means and for coupling out to said data transmission port a non-delay-sensitive time-slot from said output port of said second buffer means when a non-delay-sensitive time-slot appears at said output port of said second buffer means, each said delay-sensitive time-slots being advanced thereby past a selected one or more of time-slots being stored in said second buffer means to the position of another delay-sensitive time-slot without loss of non-delay-sensitive time-slots stored in said second buffer.

31. The master node of claim 30 wherein said ring further comprising a number of time-slot advancement groups for organizing the flow of delay-sensitive data, said number of time-slot advancement groups being less than or equal to said predetermined number of time-slots per sub-frame, each said sub-frame having one delay-sensitive time-slot assigned to each said time-slot advancement group, all said time-slots assigned to the same time-slot advancement group having the same corresponding location within respective said sub-frames, and wherein each delay-sensitive time-slot is advanced past a plurality of time-slots being stored in said second buffer means to the position of another delay-sensitive time-slot assigned to the same time-slot advancement group.

32. The master node of claim 31 including means for enabling each node to keep track of the relative position of each packet of data on said ring and on said one or more frames.

33. The master node of claim 32 including header means for defining the start of each frame.

34. The master node of claim 33 wherein each header means comprises a predetermined one or more of said time-slots.

35. A time-division-multiplexing data-communication system comprising:

a plurality of nodes for providing a connection of one or more users to a plurality of other users on said data-communication system, said nodes comprising a plurality of slave nodes and a master node, each of said nodes comprising a ring-input port, a ring-output port, and a plurality of user I/O ports; and a transmission-medium means for linking said nodes in a ring configuration wherein said ring-output port of each said node is linked to said ring-input port of another said node and wherein said ring-input port of each said node is linked to said ring-output port of another said node, said transmission-medium means linking said nodes such that only one ring linking all said nodes is formed; the flow of information between said ring users on said ring being organized into one or more frames, each said frame comprising a plurality of sub-frames, each said sub-frame having a predetermined number of time-slots wherein each said time-slot is enabled to contain a packet of data and to have a delay-status designation of delay sensitive when said time-slot is conveying information for one or more delay-sensitive ring users and to have a delay-status designation of non-delay-sensitive when said time-slot is conveying information for one or more non-delay-sensitive ring users, each said frame thereby comprising a number of time-slots equal to the product of said plurality of sub-frames and of said predetermined number of time-slots per sub-frame;

said master node comprising:

a data receiving port for coupling time-slots from said ring;

a data transmission port for coupling time-slots onto said ring;

first buffer means having an input port for coupling said time-slots into said first buffer means from said data receiving port, an output port for coupling said time-slots from said first buffer means, and adjustable storage means for storing a variable number of said time-slots up to a predetermined maximum number of said time-slots, said time-slots stored in a first-in-first-out arrangement;

second buffer means having an input port for coupling said time-slots into said second buffer means from said data receiving port, an output port for coupling said time-slots from said second buffer means, and adjustable storage means for storing a variable number of said time-slots up to a predetermined maximum number of said time-slots, said time-slots stored in a first-in-first-out arrangement;

detection means for determining a difference number equal to the total number of time-slots contained in said one or more frames of said ring less the number of time-slots on said ring traveling between said data transmission port and said data receiving port;

means for causing said second buffer means to store a number of time-slots equal to said difference number determined by said detection means;

means for causing said first buffer means to store a number of time-slots equal to said difference number less the number of time-slots held in an integer number of said sub-frames, said integer number such that said number of time-slots stored in said first buffer means is greater than zero; and output switch means coupled to said output port of said first and second buffer means for coupling out to said data transmission port a delay-sensitive time-slot from said output port of said first buffer means when a delay-sensitive time-slot appears at said output port of said first buffer means and for coupling out to said ring a non-delay-sensitive time-slot from said output port of said second buffer means when a non-delay-sensitive time-slot appears at said output port of said second buffer means, each said delay-sensitive time-slots being advanced thereby past a selected one or more of time-slots being stored in said second buffer means to the position of another delay-sensitive time-slot without loss of non-delay-sensitive time-slots stored in said second buffer.

36. The time-division-multiplexing data-communication system of claim 35 further comprising a number of time-slot advancement groups for organizing the flow of delay-sensitive data, said number of time-slot advancement groups being less than or equal to said predetermined number of time-slots per sub-frame, each said sub-frame having one delay-sensitive time-slot assigned to each said time-slot advancement group, all said time-slots assigned to the same time-slot advancement group having the same corresponding location within respective said sub-frames, and wherein each delay-sensitive time-slot in said first buffer means is advanced past a plurality of time-slots being stored in said second buffer means of each said master node to the position of another delay-sensitive time-slot assigned to the same time-slot advancement group.

37. The time-division-multiplexing data-communication system claim 36 including means for enabling each node to keep track of the relative position of each packet of data on said ring and on said one or more frames.

38. The master node of claim 37 including header means for defining the start of each frame.

39. The master node of claim 38 wherein each header means comprises a predetermined one or more of said time-slots.

40. The time-division-multiplexing data-communication system of claim 39 wherein each said slave node includes:

a header-detector means for detecting said frame header means, said header-detector means including an input port connected to said ring-input of said slave node and an output;

a drop-insert control means for determining if a time-slot received at said ring-input port of said slave node contains data for a user linked to said slave node, said drop-insert control means comprising an input responsive to said output of said header-detector means, a first output and a second output;

an I/O converter means for coupling time-slots between said ring and one or more said ring users, said I/O converter means including a first input port connected to said ring-input port of said slave node, a ring-output port, a plurality of user-I/O ports for linking said one or more said ring users to said slave node, and a second input port responsive to said first output of said drop-insert control means, said converter means having storage capacity for at least one time-slot; and an output-switch means for coupling a time-slot from said ring-input port of said slave to said ring-output port of said ring when a time-slot is to be transmitted through said slave node and for coupling a time-slot from said ring-output port of said I/O converter means to said ring-output port of said slave node when a time-slot from said I/O converter is to be transmitted onto said ring, said output-switch means responsive to said second output of said drop-insert control means.

41. A master node for controlling the flow of information on a time-division-multiplexing ring having a plurality of slave nodes connected thereto, each said slave node for enabling data transfer between said ring and one or more ring users, the flow of information between said ring users on said ring being organized into one or more frames, each said frame comprising a non-prime number of time-slots wherein each said time-slot is enabled to contain a packet of data, each said frame also organized into a plurality of overlay sets for prioritizing the delivery of said time-slots on said ring, said plurality of overlay sets being less than or equal to the number of unique divisors that can be constructed from the set of prime factors of said non-prime number of time-slots of each said frame, each said unique divisor producing an integer quotient greater than one when dividing said non-prime number of time-slots, each said overlay set comprising one of said unique divisors such that no two of said overlay sets have the same integer quotient, each said overlay set defining a plurality of time-slot groups equal to its said corresponding unique divisor, each time-slot group having a number of contiguous time-slots equal to the integer quotient of its corresponding overlay set, said master node comprising:
- means for labeling the delay-status designation of each said time-slot in said frame as non-delay sensitive when said time slot is conveying data for a non-delay-sensitive user and as delay sensitive when said time-slot is conveying data for a delay-sensitive user, said means including means for labeling each said time-slot as being in a selected one of said overlay sets;
- a data receiving port for coupling time-slots from said ring;
- a data transmission port for coupling time-slots onto said ring;
- primary buffer means having an input port for coupling said time-slots into said primary buffer means from said data receiving port, an output port for coupling said time-slots from said primary buffer means, and storage means for storing a predetermined number of said time-slots, said time-slots stored in a first-in-first-out arrangement;
- a number of secondary buffer means equal to said number of overlay sets, one secondary buffer means associated with each said overlay set, each said secondary buffer means having an input port for coupling said time-slots into each said secondary buffer means from said data receiving port, an output port for coupling said time-slots from each said secondary buffer means, and storage means for storing a predetermined number of said time-slots, said time slots stored in a first-in-first-out arrangement; and
- output switch means coupled to said output port of said primary buffer means and to the respective output ports of said number of secondary buffer means and responsive to said labeling means for coupling out to said data transmission port a non-delay-sensitive time-slot from said output port of said primary buffer means when a non-delay-sensitive time-slot appears at said output port of said primary buffer means and for coupling out to said data-transmission port a delay-sensitive time-slot from a selected one of said secondary buffer means when a delay-sensitive time-slot in the overlay set corresponding to said selected secondary buffer means appears at its said output port, each said delay-sensitive time-slot being advanced thereby past a selected one or more of said time-slots being stored in said primary buffer means to the position of another delay-sensitive time-slot without loss of non-delay-sensitive time-slots stored in said primary buffer.

42. The master node of claim 41 wherein said primary buffer means comprises means for causing its storage means to store a variable number of said time-slots up to said predetermined number of time-slots and wherein each of said secondary buffer means comprises means for causing its respective storage means to store a variable number of said time-slots up to said predetermined number of time-slots, said master node further comprising:
- detection means for determining a difference number equal to the total number of time-slots contained in said one or more frames of said ring less the number of time-slots on said ring traveling between said data transmission port and said data receiving port;
- means for causing said primary buffer means to store a number of time-slots equal to said difference number determined by said detection means; and
- means for causing each said secondary buffer means to store a number of time-slots equal to said difference number less an integer number of quotients defined by the overlay set corresponding to said secondary buffer means, said integer number such that said number of time-slots stored in said secondary buffer means is greater than zero.

43. The master node of claim 41 wherein each overlay-set divisor is an integer multiple of all overlay-set divisors less than said each overlay-set divisor.

44. The master node of claim 43 wherein said ring further comprising a plurality of time-slot advancement groups for organizing the flow of delay-sensitive data, each said time-slot advancement group associated with one of said overlay sets, each time-slot group of said associated overlay set having one delay-sensitive time-slot assigned to said associated time-slot advancement group, all said time-slots assigned to the same time-slot advancement group having the same corresponding location within respective time-slot groups, and wherein each delay-sensitive time-slot is advanced past a plurality of time-slots being stored in said primary buffer means to the position of another delay-sensitive time-slot assigned to the same time-slot advancement group.

45. The master node of claim 44 including means for enabling each node to keep track of the relative position of each packet of data on said ring and on said one or more frames.

46. The master node of claim 45 including header means for defining the start of each frame.

47. The master node of claim 46 wherein each header means comprises a predetermined one or more of said time-slots.

* * * * *

UNITED STATES PATENT AND TRADEMARK OFFICE
CERTIFICATE OF CORRECTION

PATENT NO. : 5,119,373

DATED : June 2, 1992

INVENTOR(S) : Fredricsson, et al.

It is certified that error appears in the above-identified patent and that said Letters Patent is hereby corrected as shown below:

On the title page, Abstract, line 11, "a re" should be —are—.

Column 4, line 60, "o" should be —to—.

Column 5, line 64, after "slave" insert —node—.

Column 7, line 17, after "buffer" insert —means—.

Column 9, line 51, after "to" delete —to—.

Column 9, line 54, after "to" delete —to—.

Column 11, line 51, "equivalent" should be —equivalently—.

Column 12, line 4, after "120c" insert —.—.

Column 12, line 4, "or" should be —of—.

Column 12, line 26, "1" should be —11—.

Column 13, line 15, after "said" insert —second—.

Column 13, line 20, before "port" insert —input—.

Column 15, line 15, second occurrence of "time-slot" should read —time-slots—.

Column 15, line 40, "rings" should be —ring—.

Column 16, line 34, second occurrence of "time-slot" should read —time-slots—.

Column 16, line 55, after "of" insert —user—.

UNITED STATES PATENT AND TRADEMARK OFFICE
CERTIFICATE OF CORRECTION

PATENT NO. : 5,119,373

DATED : June 2, 1992

INVENTOR(S) : Fredricsson, *et al.*

It is certified that error appears in the above-identified patent and that said Letters Patent is hereby corrected as shown below:

Column 16, line 60, after "each" delete —of—.

Column 17, line 31, delete "in" and insert therefor —of—.

Column 17, line 63, second occurrence of "time-slot" should read —time-slots—.

Column 20, line 1, "couples" should be —coupled—.

Column 21, line 49, "time-slots" should be —time-slot—.

Column 22, line 4, after "system" insert —of—.

Signed and Sealed this

Twelfth Day of October, 1993

Attest:

BRUCE LEHMAN

Attesting Officer

*Commissioner of Patents and Trademarks*